United States Patent
Roberge

(10) Patent No.: US 10,837,364 B2
(45) Date of Patent: Nov. 17, 2020

(54) THERMAL SHIELD FOR GAS TURBINE ENGINE DIFFUSER CASE

(71) Applicant: UNITED TECHNOLOGIES CORPORATION, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 567 days.

(21) Appl. No.: 15/417,257

(22) Filed: Jan. 27, 2017

(65) Prior Publication Data
US 2019/0003392 A1 Jan. 3, 2019

(51) Int. Cl.
*F02C 7/143* (2006.01)
*F02C 6/08* (2006.01)
(Continued)

(52) U.S. Cl.
CPC .............. *F02C 7/143* (2013.01); *F01D 5/288* (2013.01); *F02C 3/04* (2013.01); *F02C 6/08* (2013.01);
(Continued)

(58) Field of Classification Search
CPC .. F02C 7/143; F02C 7/185; F02C 7/08; F02C 6/06; F02C 6/08; F02C 9/18; F04D 15/0011; F04D 27/2015; F04D 29/40; F04D 29/424; F04D 29/4226; F04D 29/4246; F04D 29/441; F04D 29/5826; F05D 2260/213
See application file for complete search history.

(56) References Cited

U.S. PATENT DOCUMENTS 3,159,971 A * 12/1964 Moebius ................. F23R 3/283
60/740
4,254,618 A * 3/1981 Elovic ..................... F02C 7/185
60/226.1
(Continued)

FOREIGN PATENT DOCUMENTS

EP 2570619 A2 3/2013
EP 3109437 A1 12/2016

OTHER PUBLICATIONS

European Search Report for EP Application No. 18153856.2 dated Aug. 8, 2018.

*Primary Examiner* — Ehud Gartenberg
*Assistant Examiner* — Jacek Lisowski
(74) *Attorney, Agent, or Firm* — Carlson, Gaskey & Olds, P.C.

(57) ABSTRACT

A gas turbine engine comprises a fan delivering air into a bypass duct as bypass air and into a core engine. The core engine includes a high pressure compressor, a combustor, and a turbine section including a fan drive turbine driving a fan rotor through a gear reduction. The high pressure compressor having a downstream most location and air in a chamber radially outward of the combustor being air downstream of the downstream most location in the high pressure compressor. A tap taps compressed air and moves compressed air through a heat exchanger, then returns the compressed air back into a core engine housing and passes the returned air through a conduit radially outwardly of the combustor. The air is passed from the conduit radially inwardly to cool the turbine section.

18 Claims, 4 Drawing Sheets

(51) Int. Cl.
*F02C 7/18* (2006.01)
*F02K 3/115* (2006.01)
*F01D 5/28* (2006.01)
*F02C 3/04* (2006.01)
*F02C 7/36* (2006.01)
*F04D 29/44* (2006.01)
*F04D 29/58* (2006.01)

(52) U.S. Cl.
CPC ............... *F02C 7/185* (2013.01); *F02C 7/36* (2013.01); *F02K 3/115* (2013.01); *F04D 29/441* (2013.01); *F04D 29/5826* (2013.01); *F05D 2260/213* (2013.01); *F05D 2260/40311* (2013.01); *F05D 2260/606* (2013.01); *Y02T 50/676* (2013.01); *Y02T 50/6765* (2018.05)

(56) References Cited

U.S. PATENT DOCUMENTS

| | | | |
|---|---|---|---|
| 5,269,133 A * | 12/1993 | Wallace | F02C 7/185 165/142 |
| 5,297,386 A * | 3/1994 | Kervistin | F04D 27/023 60/226.1 |
| 5,581,996 A * | 12/1996 | Koch | F01D 5/141 60/266 |
| 6,220,234 B1 | 4/2001 | Baker et al. | |
| 7,823,389 B2 * | 11/2010 | Seitzer | F01D 11/24 60/782 |
| 8,307,662 B2 * | 11/2012 | Turco | F01D 5/081 60/782 |
| 8,596,968 B2 | 12/2013 | Emmerson | |
| 8,656,722 B2 * | 2/2014 | Norris | F02C 7/14 60/772 |
| 8,820,072 B2 | 9/2014 | Figura et al. | |
| 9,291,171 B2 | 3/2016 | Bunel et al. | |
| 2003/0152814 A1 * | 8/2003 | Gupta | F01D 5/284 428/702 |
| 2014/0219794 A1 * | 8/2014 | Yilmaz | F02C 7/12 416/1 |
| 2016/0237908 A1 | 8/2016 | Snape et al. | |
| 2017/0288678 A1 * | 10/2017 | Estabrooks | H03L 1/04 |
| 2018/0128170 A1 * | 5/2018 | Owdeh | F02C 6/08 |

* cited by examiner

THERMAL SHIELD FOR GAS TURBINE ENGINE DIFFUSER CASE

BACKGROUND OF THE INVENTION

This application relates to an apparatus and method for providing cooling to a gas turbine engine diffuser case Gas turbine engines are known and typically include a fan delivering air into a bypass duct as propulsion air and into a core engine. Air in the core engine passes into a compressor where it is subsequently mixed with fuel and ignited. Products of this combustion pass over turbine rotors driving them to rotate and to, in turn, drive the fan and compressor rotors.

Traditionally, a fan drive turbine rotated at the same speed as a fan rotor. However, more recently, a gear reduction has been placed between the fan drive turbine and the fan rotor. This allows the fan drive turbine to rotate at faster speeds and the fan rotor to rotate at slower speeds.

With the inclusion of the gear reduction, the pressures developed in a high pressure compressor have increased as have the temperatures. This high pressure and high temperature air is used as the coolant for airfoils and other components in the turbine section which are subject to high gaspath temperatures A design challenge for gas turbine engine designers is to create gas turbine engine components which will be in the path of such high temperatures, such that they can still survive the stress and thermal challenges.

SUMMARY OF THE INVENTION

In a featured embodiment, a gas turbine engine comprises a fan delivering air into a bypass duct as bypass air and into a core engine. The core engine includes a high pressure compressor, a combustor, and a turbine section including a fan drive turbine driving a fan rotor through a gear reduction. The high pressure compressor having a downstream most location and air in a chamber radially outward of the combustor being air downstream of the downstream most location in the high pressure compressor. A tap taps compressed air and moves compressed air through a heat exchanger, then returns the compressed air back into a core engine housing and passes the returned air through a conduit radially outwardly of the combustor. The air is passed ng from the conduit radially inwardly to cool the turbine section.

In another embodiment according to the previous embodiment, the tap is from a location downstream of the downstream most location in the high pressure compressor.

In another embodiment according to any of the previous embodiments, the heat exchanger is placed in the bypass duct with the bypass air cooling the tapped air in the heat exchanger.

In another embodiment according to any of the previous embodiments, the conduit extends generally circumferentially about a center axis of the engine.

In another embodiment according to any of the previous embodiments, the conduit is defined between inner and outer housing walls and extends in an upstream direction to be aligned with a compressor diffuser positioned downstream of the downstream most location in the compressor.

In another embodiment according to any of the previous embodiments, components extend through the inner and outer walls to provide functions with regard to the combustor and a location through which the components extend is sealed to limit leakage of the air in the conduit radially outwardly.

In another embodiment according to any of the previous embodiments, the components include a fuel injector nozzle.

In another embodiment according to any of the previous embodiments, the inner wall is provided with at least one coating.

In another embodiment according to any of the previous embodiments, at least one coating includes a thermal barrier coating.

In another embodiment according to any of the previous embodiments, at least one coating also includes a low emissivity coating.

In another embodiment according to any of the previous embodiments, at least one coating includes a low emissivity coating.

In another embodiment according to any of the previous embodiments, the heat exchanger is placed in the bypass duct with the bypass air cooling the tapped air in the heat exchanger.

In another embodiment according to any of the previous embodiments, the conduit extends generally circumferentially about a center axis of the engine.

In another embodiment according to any of the previous embodiments, the conduit is defined between inner and outer housing walls and extends in an upstream direction to be aligned with a compressor diffuser positioned downstream of the downstream most location in the compressor.

In another embodiment according to any of the previous embodiments, components extend through the inner and outer walls to provide functions with regard to the combustor and a location through which the components extend is sealed to limit leakage of the air in the conduit radially outwardly.

In another embodiment according to any of the previous embodiments, the components include a fuel injector nozzle.

In another embodiment according to any of the previous embodiments, the inner wall is provided with at least one coating.

In another embodiment according to any of the previous embodiments, at least one coating includes a thermal barrier coating.

In another embodiment according to any of the previous embodiments, at least one coating also includes a low emissivity coating.

In another embodiment according to any of the previous embodiments, at least one coating includes a low emissivity coating.

These and other features may be best understood from the following drawings and specification.

DETAILED DESCRIPTION

Figure 1:
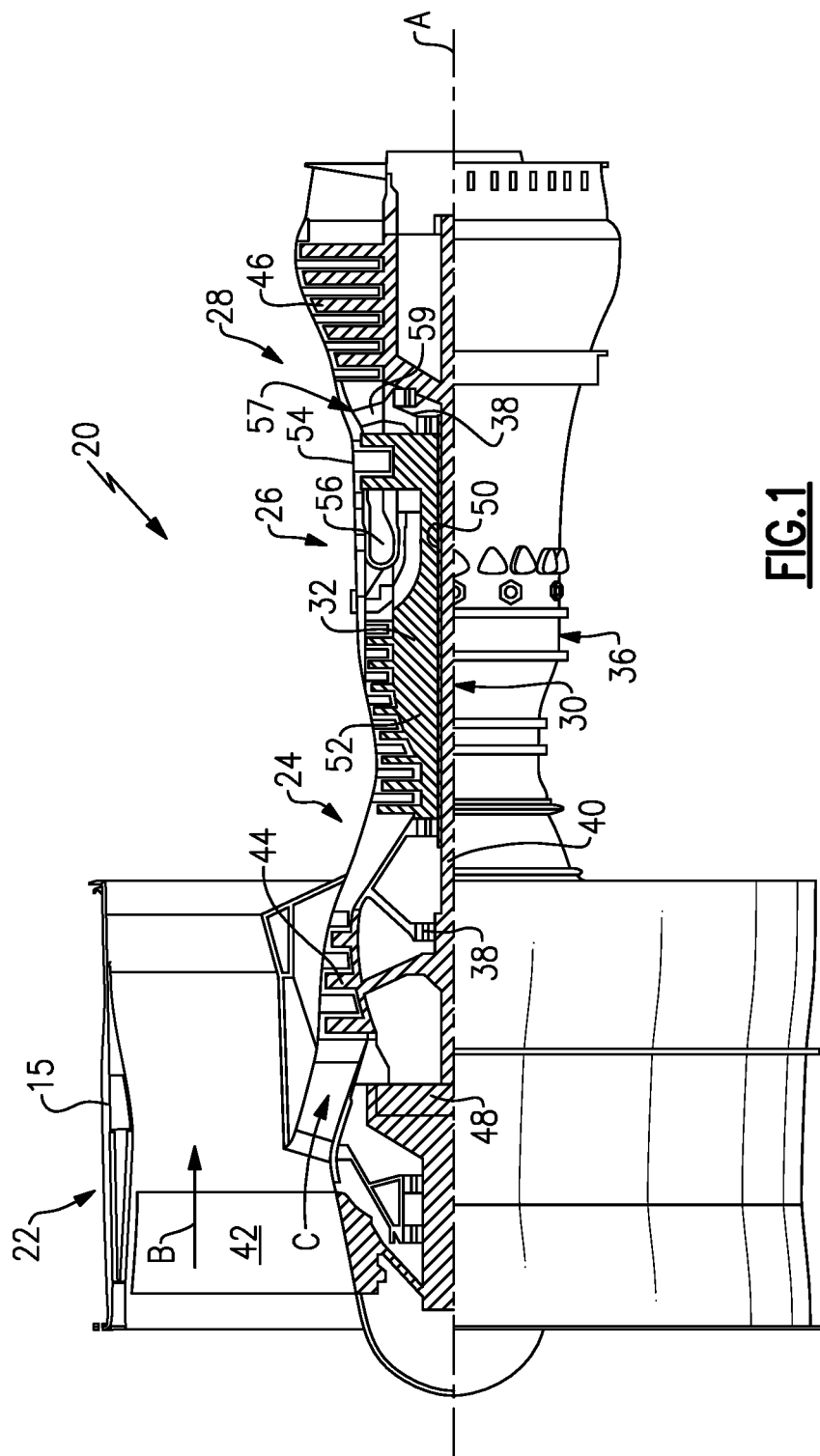
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
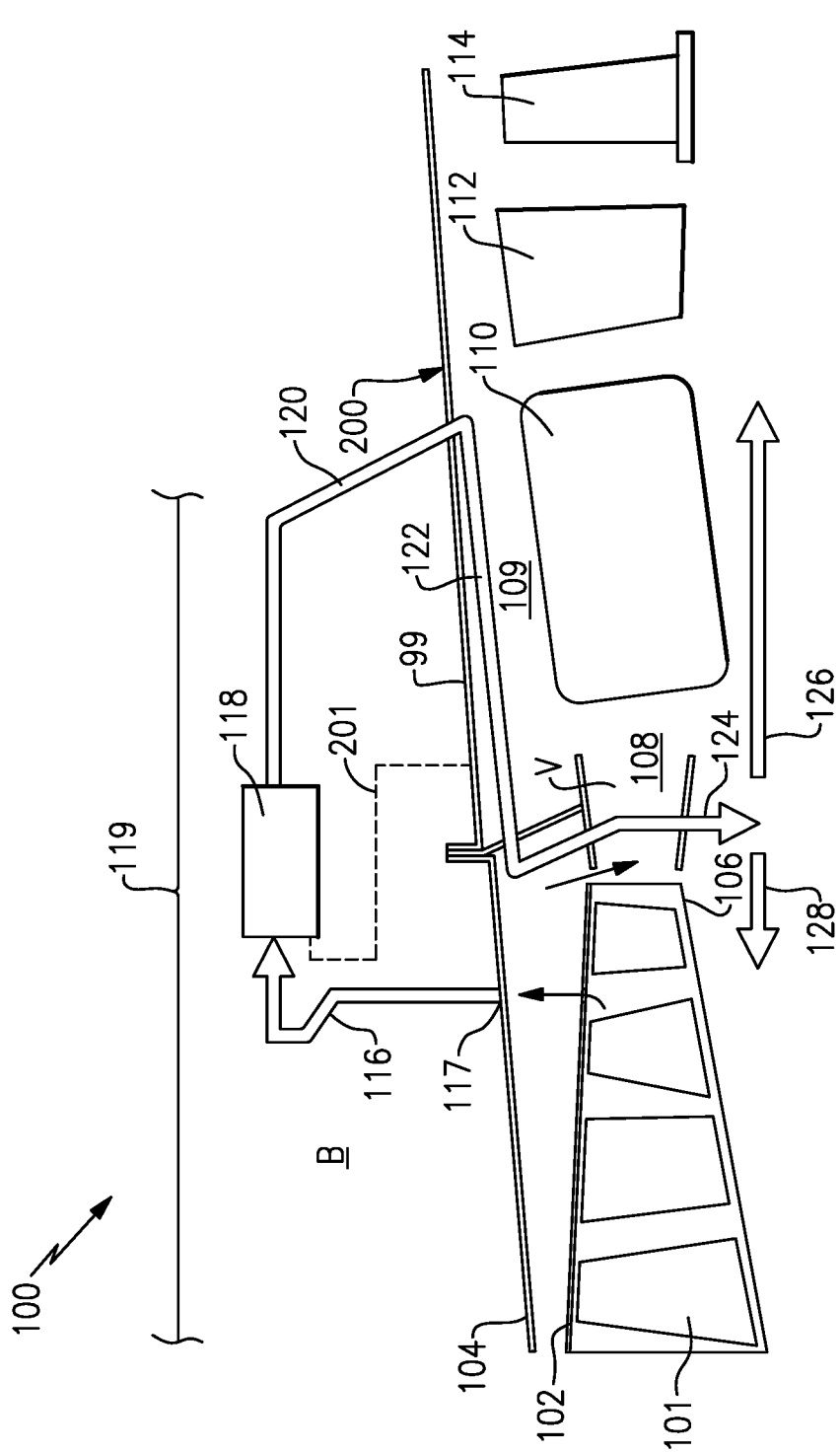
FIG. 2 schematically shows an embodiment of this disclosure.

FIG. 2 shows an embodiment 100 wherein a high pressure compressor 101 is defined by an outer compressor flowpath shroud 102. A compressor case 104 is positioned radially outwardly of the outer compressor flowpath shroud 102. A downstream most point 106 in the high pressure compressor 101 is defined and consists of the highest pressure in the compression system. The pressures reached here are known as P3 and the temperature at this point is known as T3. The P3 and T3 values with a geared gas turbine engine are increasing in the pursuit of higher cycle thermal efficiencies through increased overall cycle pressure ratio. Providing gas turbine engine components that can survive these increases in pressure and temperature becomes an important design goal.

A compressor diffuser 108 is positioned downstream of point 106 and air is delivered into a chamber 109, which is radially outward of and surrounds a combustor 110. The air in chamber 109 provides flow to the combustor 110 in a manner that provides combustor 110 inner and outer wall cooling as well as mixing of air and fuel control of the combustion process. The outer wall of the chamber 109 is formed by a diffuser outer case 99. A high pressure turbine vane 112 and high pressure turbine blade 114 are positioned downstream of the 110. Not illustrated in this view is a low pressure turbine, which may be the fan drive turbine driving a fan rotor through a gear reduction as shown in FIG. 1.

Air is tapped at 117 through conduit 116 from the high pressure compressor 101 in one or more circumferential locations. Notably, the tap 116 may actually be downstream of the high pressure compressor 101 and could be in the chamber 109, as shown at 201 in phantom. The air flow in tap 116 passes through a heat exchanger 118 to generate reduced temperature turbine cooling air. The heat exchanger 118 is used to reduce the temperature of high compressor discharge air T3 while maintaining as much of the pressure P3 as possible. This allows high pressure turbine components including vane 112 and blade 114 to utilize the required high pressure coolant that approaches pressure P3 with a lower temperature and associated benefits in coolant and component durability.

Heat exchanger 118 is positioned inwardly of a fan case 119 and in the bypass duct B, as described in FIG. 1. The air in the bypass duct cools the air in the heat exchanger 118, which is then delivered through a line or conduit 120 to coolant manifold 122 in the diffuser outer case 99. Note that in other embodiments the coolant provided in the heat exchanger 118 may be provided by other lower temperature air sources within the cycle. Alternatively the engine's fuel system could be used through fuel to air heat exchange in place of or in addition to air to air heat exchangers. The cooling air in coolant manifold 122 cools the diffuser outer case 99 forming the chamber 109 as will be better described below. From coolant manifold 122, the air returns through a path 124, which may be through vanes V in diffuser 108. The air then passes into paths 126 and 128 to provide cooling to compressor and turbine components that would normally be subjected to high temperature T3 conditions.

Figure 3:
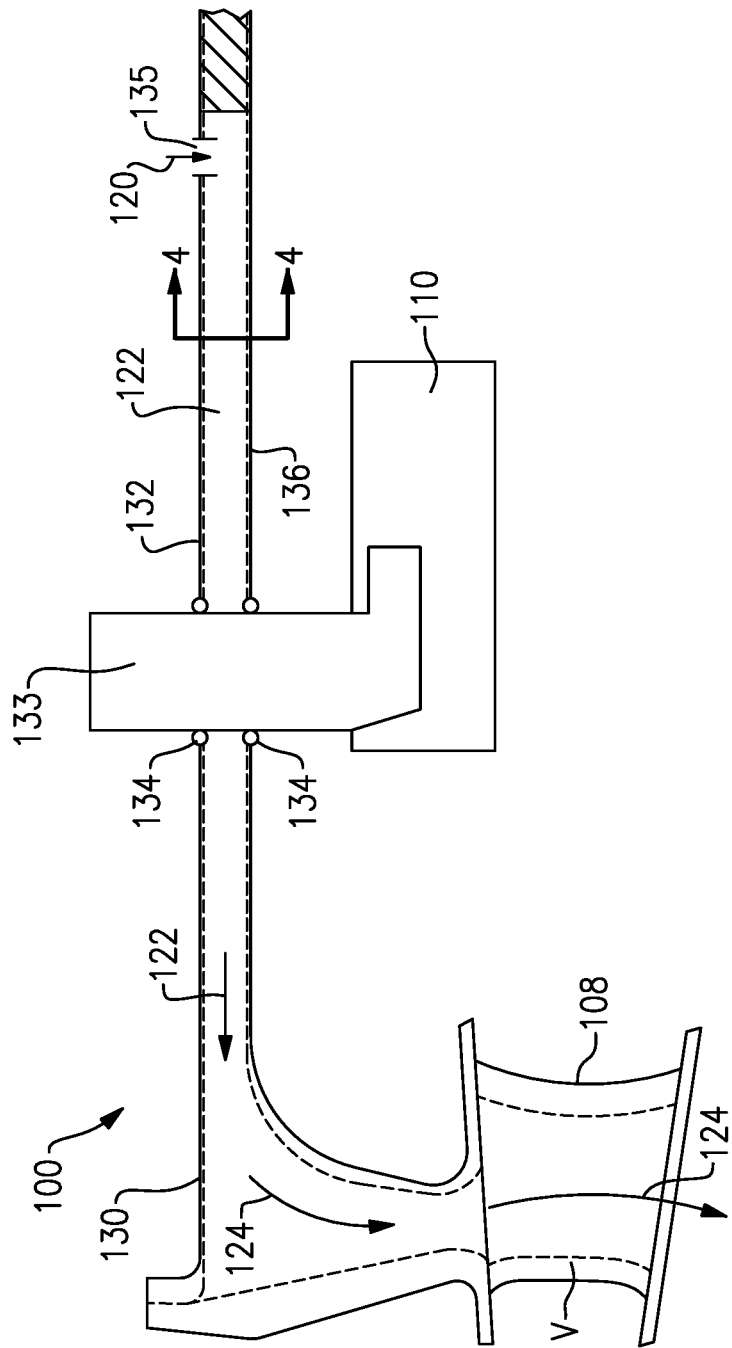
FIG. 3 schematically shows a feature.

FIG. 3 shows a further detail of the embodiment 100. In particular, the coolant manifold 122 is shown to be between inner and outer housing portions 132 and 136 of diffuser case 99. That is, a chamber is created within a portion of what is described as the diffuser outer case 99 in FIG. 2. Air from line 120 moves into an opening 135 and will move circumferentially about a center axis of the engine to an end 130 of the coolant manifold 22, which directs the air inwardly as shown at 124.

Outer diffuser case wall 132 provides the primary structure connecting the turbine section with the compressor section. It also resists the high pressure P3 in chamber 109. The inner diffusor case wall 136 has significantly reduced structural requirements and serves to isolate flow in the coolant manifold 122 from air in the chamber 109.

As can be appreciated, components must pass through this double-wall structure forming the coolant manifold 122. As an example, a fuel injector 133 is shown, which extends into the combustor 110. As shown, seals 134 are placed around this component, such that the air may flow through the coolant manifold 122 and around the component 133 to provide the cooling air without excessive leakage into chamber 109.

Figure 4:
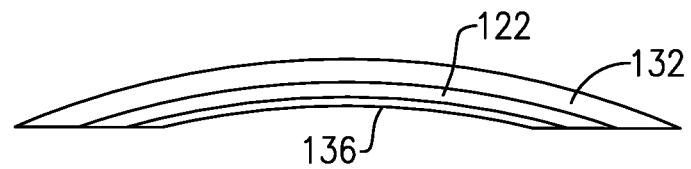
FIG. 4 is a cross-sectional view along line 4-4 of FIG. 3.

FIG. 4 shows further detail of the coolant manifold 122 between the housing walls 136 and 132.

Figure 5:
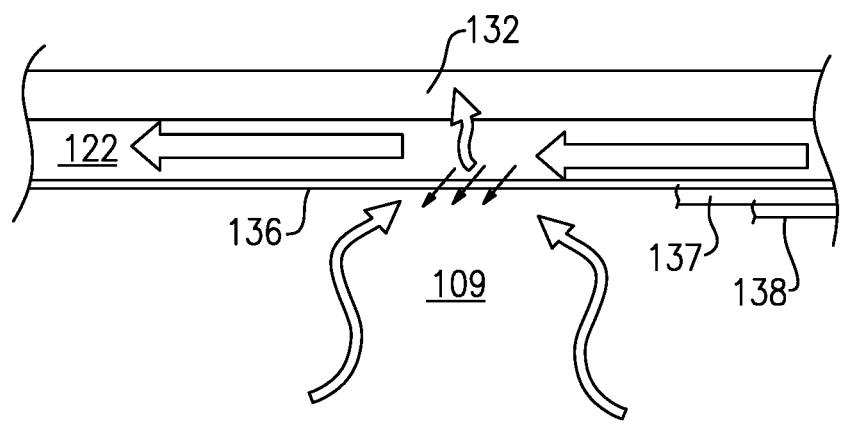
FIG. 5 shows further features.

FIG. 5 shows further details and potential embodiments. The outer diffusor case wall 132 is shown to be substantially thicker than the inner diffusor case wall 136 for reasons previously described. The wall 136 may be provided with coatings, such as coatings 137 and 138, shown partially on an inner face of the wall 136.

A coating 137 may be a thermal barrier coating. One potential thermal barrier coating is yttria stabilized zirconium oxide.

The coating 138 may be a low emissivity coat, such as a coating having high reflectivity. One such potential coating would consist of hollow ceramic particle micro-spheres.

It should be understood that the pressure within coolant manifold 122 should be roughly the same pressure as within the chamber 109 with the difference primarily driven by heat exchanger 118, conduits 116 and 120 and dump losses through diffuser 108. This will balance internal and external forces and reduce the pressure loading across inner diffusor case wall 136. In addition, convective heat transfer between the coolant manifold 122 and chamber 109 through inner diffusor case wall 136 are affected by thermal barrier coating 137 and the temperature and velocity of flow in coolant manifold 122. Similarly, radiant heat from within chamber 109 from combustor 110 will heat the wall 136, and may be reduced through the use of coatings 137 and 138 as well as by the cooling air in coolant manifold 122.

One further option illustrated schematically in FIG. 2 is a supply of a second air flow shown at 200 supplemented or mixed with the air supplied by line 120. In this case, the coolant manifold 122 formed by outer diffuser case 132 and inner wall 136 acts as a mixing chamber from one or more alternate sources of coolant flow. This could be higher or lower pressure, and/or temperature, compressor air or air from a secondary engine or aircraft subsystem. The mixing of separate flows could be continuous or controlled mixing as a function of engine operating condition to maximize coolant effectiveness and/or to minimize coolant flow impact on engine efficiency.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan delivering air into a bypass duct as bypass air and into a core engine;
   said core engine including a high pressure compressor, a combustor, and a turbine section including a fan drive turbine driving a fan rotor through a gear reduction;
   said high pressure compressor having a downstream most location, and compressed air in a chamber radially outward of said combustor being air downstream of said downstream most location in said high pressure compressor, and said compressed air passing to said combustor;
   a tap for tapping compressed cooling air and moving the compressed cooling air through a heat exchanger, then returning said compressed cooling air back into a core housing and passing the compressed cooling air through a conduit radially inward of said core housing, and radially outwardly of said combustor, and said cooling air passing from said conduit radially inwardly to cool said turbine section;
   wherein said conduit is defined between inner and outer core housing walls and extends in an upstream direction to be aligned with a compressor diffuser positioned downstream of said downstream most location in said high pressure compressor;
   said inner core housing wall is positioned outward of the chamber that supplies the compressed air to said combustor and defines said chamber with said combustor, such that said compressed air in said chamber contacts said inner core housing wall;
   wherein said conduit extends generally circumferentially about a center axis of said gas turbine engine; and
   wherein components extend through said inner and outer core housing to provide functions with regard to said combustor and a location through which said components extend is sealed to limit leakage of said compressed cooling air in said conduit radially outwardly.

2. The gas turbine engine as set forth in claim 1, wherein said components include a fuel injector nozzle.

3. The gas turbine engine as set forth in claim 1, wherein said inner core housing wall is provided with at least one coating.

4. The gas turbine engine as set forth in claim 3, wherein said at least one coating includes a thermal barrier coating.

5. The gas turbine engine as set forth in claim 4, wherein said at least one coating also includes a low emissivity coating.

6. The gas turbine engine as set forth in claim 3, wherein said at least one coating includes a low emissivity coating.

7. A gas turbine engine comprising:
a fan delivering air into a bypass duct as bypass air and into a core engine;
said core engine including a high pressure compressor, a combustor, and a turbine section;
said high pressure compressor having a downstream most location and compressed air in a chamber radially outward of said combustor being air downstream of said downstream most location in said high pressure compressor, and said compressed air passing to said combustor;
a tap for tapping compressed cooling air and moving the compressed cooling air through a heat exchanger, then returning said compressed cooling air back into a core housing and passing the compressed cooling air through a conduit radially inward of said core housing, and radially outwardly of said combustor, and said cooling air passing from said conduit radially inwardly to cool said turbine section;
wherein said conduit is defined between inner and outer core housing walls and extends in an upstream direction to be aligned with a compressor diffuser positioned downstream of said downstream most location in said high pressure compressor;
said inner core housing wall is positioned outward of the chamber that supplies the compressed air to said combustor and defines said chamber with said combustor, such that air in said chamber contacts said inner core housing wall;
wherein said conduit extends generally circumferentially about a center axis of said gas turbine engine; and
wherein components extend through said inner and outer core housing walls to provide functions with regard to said combustor and a location through which said components extend is sealed to limit leakage of said compressed air in said conduit radially outwardly.

8. The gas turbine engine as set forth in claim 7, wherein said tap is from a location downstream of said downstream most location in said high pressure compressor.

9. The gas turbine engine as set forth in claim 8, wherein said heat exchanger is placed in the bypass duct with the bypass air cooling the compressed cooling air in said heat exchanger.

10. The gas turbine engine as set forth in claim 7, wherein said heat exchanger is placed in the bypass duct with the bypass air cooling the compressed cooling air in said heat exchanger.

11. The gas turbine engine as set forth in claim 7, wherein said components include a fuel injector nozzle.

12. The gas turbine engine as set forth in claim 7, wherein said inner core housing wall is provided with at least one coating.

13. The gas turbine engine as set forth in claim 12, wherein said at least one coating includes a thermal barrier coating.

14. The gas turbine engine as set forth in claim 13, wherein said at least one coating also includes a low emissivity coating.

15. The gas turbine engine as set forth in claim 12, wherein said at least one coating includes a low emissivity coating.

16. The gas turbine engine as set forth in claim 7, wherein said components include a fuel injector nozzle.

17. A gas turbine engine comprising:
a core engine including a high pressure compressor, a combustor, and a turbine section;
said high pressure compressor having a downstream most location and compressed air in a chamber radially outward of said combustor being air downstream of said downstream most location in said high pressure compressor, and said compressed air passing to said combustor;
a tap for tapping compressed cooling air and moving the compressed cooling air through a heat exchanger, then returning said compressed cooling air back into a core housing and passing the compressed cooling air through a conduit radially inward of said core housing, and radially outwardly of said combustor, and said compressed cooling air passing from said conduit radially inwardly to cool said turbine section;
wherein said conduit is defined between inner and outer core housing walls and extends in an upstream direction to be aligned with a compressor diffuser positioned downstream of said downstream most location in said high pressure compressor; and
said inner core housing wall is positioned outward of the chamber that supplies the compressed air to said combustor and defines said chamber with said combustor, such that the compressed air in said chamber contacts said inner core housing wall;
wherein said conduit extends generally circumferentially about a center axis of said gas turbine engine; and
wherein components extend through said inner and outer core housing to provide functions with regard to said combustor and a location through which said components extend is sealed to limit leakage of said compressed cooling air in said conduit radially outwardly.

18. The gas turbine engine as set forth in claim 17, wherein said components include a fuel injector nozzle.

* * * * *